United States Patent [19]
Calcagno

[11] 3,891,015
[45] June 24, 1975

[54] CONSTANT DEPTH CUTTER ASSEMBLY

[75] Inventor: Kenneth H. Calcagno, New Haven, Conn.

[73] Assignee: Olin Corporation, New Haven, Conn.

[22] Filed: Aug. 10, 1973

[21] Appl. No.: 387,399

Related U.S. Application Data

[63] Continuation of Ser. No. 286,378, Sept. 5, 1972, abandoned.

[52] U.S. Cl. ................... 144/136 J; 83/5; 90/13 C; 90/14; 90/15 R; 90/11 E; 90/62 R; 308/DIG. 1

[51] Int. Cl. ....... B27c 5/02; B27m 3/00; B23c 3/00

[58] Field of Search ............ 83/5; 144/136 J, 136 C, 144/136, 134 D, 134 F, 309; 90/12, 13, 14, 15, 11 E, 62 R; 308/DIG. 1

[56] References Cited
UNITED STATES PATENTS
| | | | |
|---|---|---|---|
| 2,565,914 | 8/1951 | Dies | 144/136 J |
| 3,110,226 | 11/1963 | Dionne | 90/62 |
| 3,265,452 | 8/1966 | Pan et al. | 308/DIG. 1 |

OTHER PUBLICATIONS

Ekstrom, Carlson et Co., Gantry Type Mill, (1) Delivery Order No. 113519c, (1) Performance Test and 4 Prints, ER1811, ER1809, ER1810 and GM-A-4).

*Primary Examiner*—Donald R. Schran
*Attorney, Agent, or Firm*—Donald R. Motsko; William W. Jones

[57] ABSTRACT

An apparatus and method for scoring or grooving a workpiece wherein the cuts in the workpiece are maintained at a substantially constant depth. A work-engaging member is provided for contacting the surface of the workpiece with the cutter projecting beyond the member a distance equal to the desired cut depth. The member is pivoted about a point in the plane of the work-engaging surface of the member, through which point passes the axis of the cutter. The pivotal movement of the member is accomplished through a ball and socket joint.

8 Claims, 8 Drawing Figures

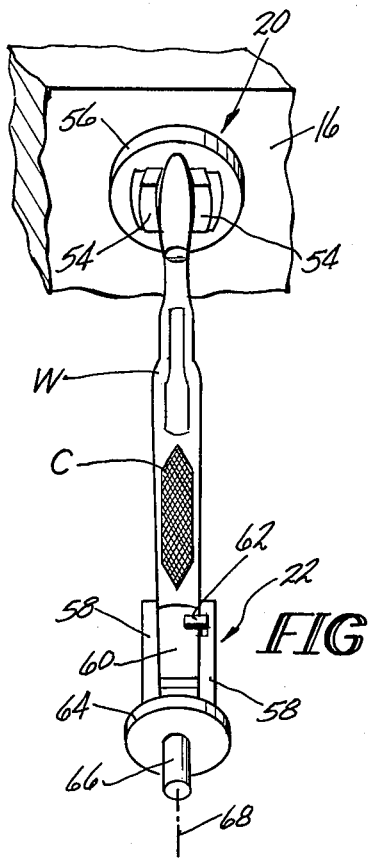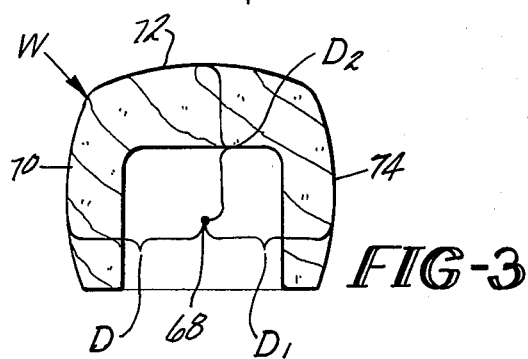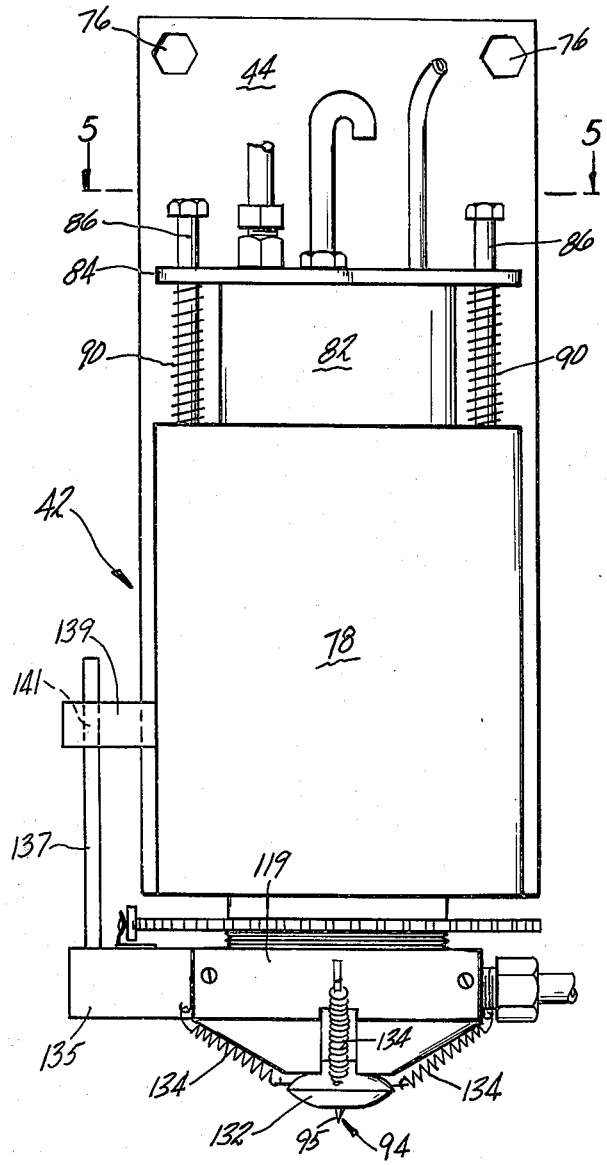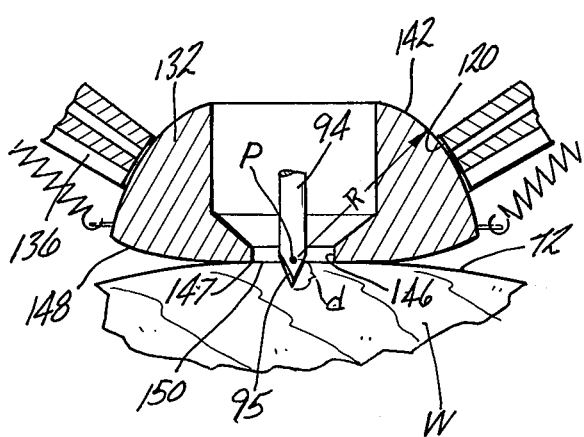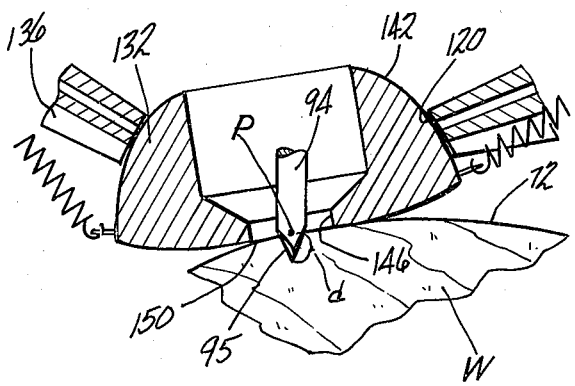

CONSTANT DEPTH CUTTER ASSEMBLY

This is a continuation of application Ser. No. 286,378, filed Sept. 5, 1972, now abandoned.

This invention relates to an apparatus and method for controlling the depth of cuts made in a workpiece, and more particularly, to an apparatus and method for checkering the gunstock of a firearm.

Attempts have been made in the prior art at controlling the depth of cuts made in a workpiece when the latter is scored. A particular workpiece may be cut or scored for a variety of reasons, as, for example, a preliminary step in manufacture, for decorating the workpiece, for providing certain areas of the workpiece with a predetermined weakening for subsequent rupture, and for any number of other reasons. If the workpiece is planar, the depth of cuts or scores imparted thereto can be readily controlled by providing a rigid workengaging member which contacts the surface of the work and beyond which the cutter projects. Such an arrangement is shown in U.S. Pat. No. 3,555,950, issued Jan. 19, 1971 to Gijsbers et al. The use of such a rigid "depth foot" will not suffice, however, when the workpiece is not planar, and particularly where the workpiece includes concavely and convexly curved portions.

A firearm gunstock is a workpiece with non-planar surfaces which are frequently scored or checkered to provide ornamentation and high friction areas for gripping the gun tightly. Gunstocks can be checkered by a number of different methods. For example, the checkering can be done by hand by skilled craftsmen cutting over a predetermined pattern which is marked on the gunstock. The resulting checkering, however, varies with the skill of the craftsman, and is quite a costly procedure requiring a great deal of time to turn out one finished stock. Checkering can also be done by machine, as for example by embossing the gunstock with heated dies under great pressure. The resulting pattern is not cut into the wood, but rather burned or deformed into the wood. Such checkering is not generally as aesthetically pleasing to the eye as is checkering which is formed by cutting, however.

Gunstocks can also be checkered by cutting with machines of varying complexity. Checkering machines or tools shown in the prior art vary from the relatively simple hand-operated tools disclosed in U.S. Pat. Nos. 2,238,304 to Belanger, issued Apr. 15, 1941; and 2,898,957 to Demarkis, issued Aug. 11, 1959; to the larger and more complex apparatus shown in U.S. Pat. Nos. 2,573,565 to Hailston et al., issued Oct. 30, 1951; and 2,886,078 to Crowe, issued May 12, 1959. The checkering machines or tools of the prior art thus range from a hand-held device displaying little or no automation to a much larger apparatus incorporating a substantial degree of automation. With the latter type of automated apparatus, the stock or stocks are clamped in the checkering machine and the cutters are caused to follow a predetermined pattern over the surface of the stock to cut thereinto a checkered area which corresponds to the pattern. Stocks are always provided with a plurality of checkered pattern areas, so that after one area is checkered, the stock is rotated in the apparatus to position a new area for checkering.

The paramount problem connected with highly automated checkering concerns the maintenance of a constant depth of cut throughout the entire checkering pattern, and from one pattern to another on a single stock or a plurality of stocks. This problem is further compounded by the fact that once the stock is clamped in the apparatus, it is rotated about a fixed axis which passes through the stock. Since stocks are hand sanded before checkering, the surfaces to be cut are not a fixed distance from the rotational axis on any one stock, or from stock to stock. Thus the positioning of the cutter must be varied from surface to surface in order to obtain a cut of constant depth. Furthermore, since the surface of the stock is non-planar and consists of concavely and convexly curvilinear areas, the cutter positioning must be maintained despite changes in the surface configuration.

This invention concerns the provision of a cutter depth control which can be used with hand operated or highly automated cutting apparatus for providing constant predetermined depth for cuts made in a non-planar surface of a workpiece. The depth control includes a member having a work-engaging surface, a portion of which is planar. The member is mounted for universal pivoting movement so as to maintain the planar portion thereof tangential with respect to the surface of the workpiece if the latter is convex, or chordal with respect to the work piece surface if the latter is concave. The universal pivoting movement of the member occurs about a point which is contained in the same plane containing the planar portion of the member. The cutter, which is preferably elongate, projects beyond the planar portion of the control member a distance which is equal to the desired depth of the cut, and the axis of the cutter passes through the pivoting point of the work-engaging member. Thus, the cutter will always project beyond the plane of the planar work-engaging portion of the member substantially the same preset distance regardless of the pivotal attitude of the member.

It is, therefore, an object of this invention to provide an apparatus for controlling the depth of cuts made in a workpiece.

It is a further object of this invention to provide an apparatus of the character described which produces a cut having a substantially constant depth in a non-planar surface of a workpiece.

It is yet another object of this invention to provide an apparatus of the character described which is useful for checkering gunstocks.

These and other objects and advantages of this invention will become more readily apparent from the following detailed description of a preferred embodiment of the invention taken in conjunction with the accompanying drawings, in which:

FIG. 2 is a front perspective view of the work-clamping portion of the machine of FIG. 1 showing a gunstock clamped in position therein;

FIG. 3 is a vertical sectional view of the gunstock clamped for checkering and showing the axis about which the stock is pivoted during the checkering operation;

FIG. 4 is a front elevation of the cutter and cutter motor housing of the machine of FIG. 1;

FIG. 6 is a sectional view of the cutter and work-contacting member shown cutting into a gunstock; and FIG. 7 is a sectional view similar to FIG. 6 but showing the pivotal movement of the work-contacting member as the cutter moves over the non-planar work surface, and further showing that the cut depth remains constant as the member pivots.

Figure 1:
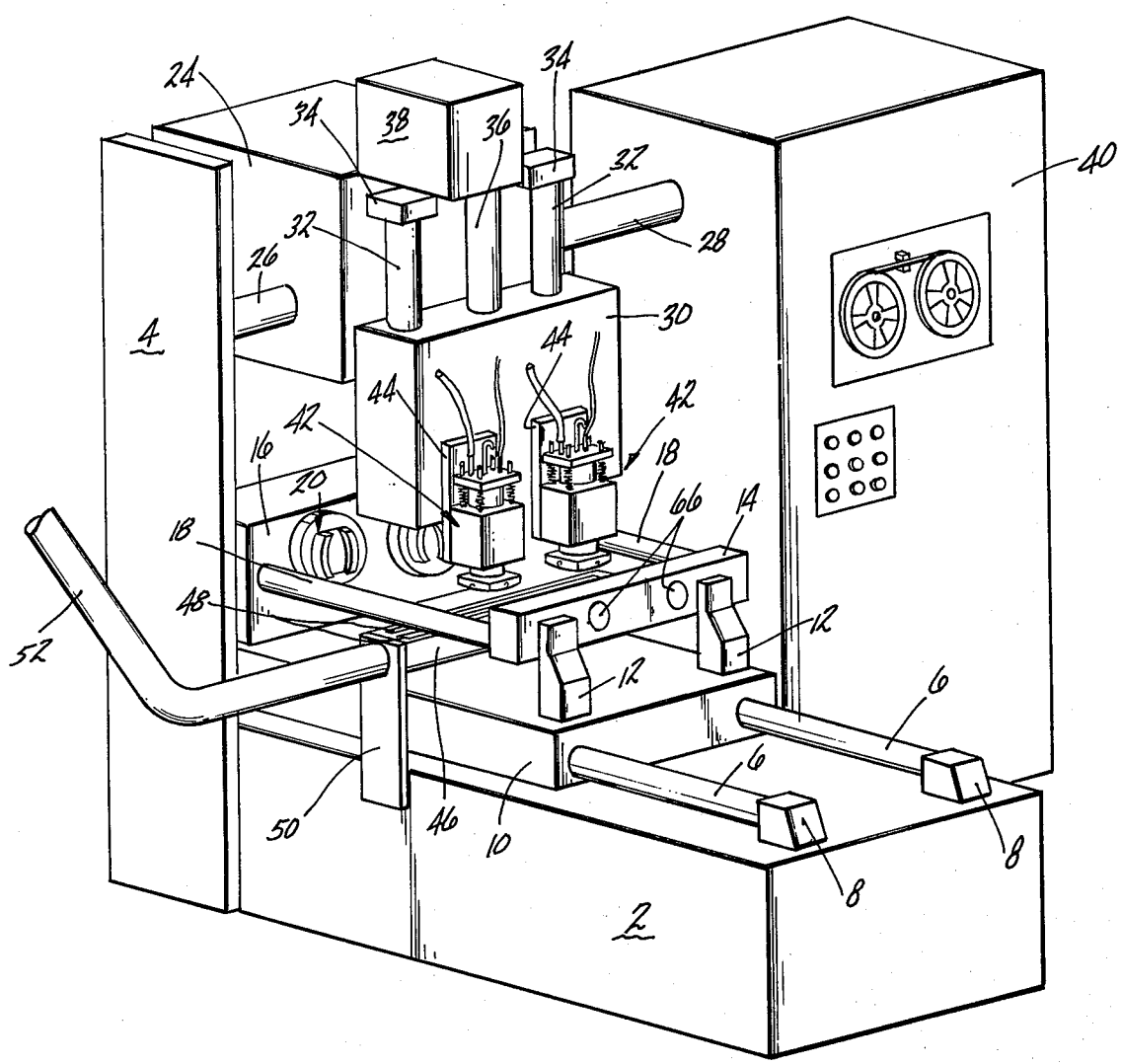
FIG. 1 is a perspective view of an automated checkering machine utilizing a preferred embodiment of the depth control of this invention, which machine is controlled by a conventional punched tape.

Referring now to the drawings, FIG. 1 discloses a fully automated machine for checkering gunstocks. The machine inclcudes a base 2 and a vertical support 4. A pair of horizontal pillars 6 are mounted on blocks 8 on the base 2 and a bolster member 10 is mounted on the pillars 6 for reciprocating horizontal movement thereover. Conventional ball screw drive means (not shown) is connected to the bolster 10 to reciprocate the latter. A pair of brackets 12 are mounted on the bolster 10 and a front block 14 is secured to the brackets 12. A rear block 16 is mounted on the bolster 10 and spaced apart from the front block 14 by a pair of spacer rods 18. A rear work-clamping assembly indicated generally by the numeral 20 is mounted on the rear block 16. A front work-clamping assembly indicated generally by the numeral 22 (see FIG. 2) is mounted on the front block 14. The mode of operation of the work-clamping assemblies will be explained in greater detail hereinafter.

A first upper bolster member 24 is mounted for horizontal reciprocating movement over a pair of horizontal pillars 26 (only one of which is shown) which are secured to the vertical support 4. A conventional ball screw mechanism 28 is selectively operable to impart the reciprocatory movement to the bolster 24. A second upper bolster member 30 is mounted on a pair of vertical pillars 32 which in turn are mounted on blocks 34 secured to the first upper bolster 24. A conventional ball screw drive mechanism 36 imparts vertical reciprocatory motion to the bolster member 30, the drive mechanism 36 being actuated by a motor contained in a housing 38 mounted on the first upper bolster 24. The reciprocatory movement of the bolsters 10, 24 and 30 is completely controlled by a conventional punched tape control mechanism 40. The cutter assemblies, identified generally by the numeral 42, are mounted on brackets 44 secured to the second upper bolster 30. The mode of operation of the cutter assemblies 42 will be more thoroughly described hereinafter. It will be noted that movement of the cutter assemblies 42 in the X and Y directions is imparted by reciprocatory movement of the upper bolsters 24 and 30 respectively, and movement of the work in the Z direction is imparted by reciprocatory movement of the bolster 10.

A hollow manifold member 46 having slots 48 in its upper surface is mounted on brackets 50 secured to the base 2. The manifold 46 is disposed below the work and is connected to a suction conduit 52 which is turn leads to a source of vacuum (not shown). Thus the manifold 46 is operative to remove from the work area, by vacuum, wood dust which is produced by the cutting operation.

Referring now to FIG. 2, a work piece W in the form of a firearm stock is shown clamped in place in the clamp assemblies 20 and 22. the clamp assembly 20 includes a pair of opposed jaws 54 which are mounted in a rotor 56 rotatably mounted in the block 16. The jaws are selectably movable laterally between an open position shown in FIG. 1 and a closed position shown in FIG. 2. When in the closed position, the jaws 54 grip the butt end portion of the gunstock W. The clamp assembly 22 includes a pair of offset side plates 58 having a bottom plate (not shown) extending there between to form a U-shaped recess into which the forearm portion of the gunstock can be slipped. A pivoting top cover plate 60 is then dropped down over the top of the forearm of the stock W and held in place by a pivoting latch 62 mounted on one of the side plates 58 to lock the forearm end of the stock W in place. The plates 58 and 60, and the bottom plate are all mounted on a disc 64 secured to a shaft 66 rotatably mounted in the block 14 (see FIG. 1). A rotatable driving mechanism (not shown) of conventional construction is operative to rotationally drive the rotor 56 to in turn rotate the workpiece (the gunstock) W about the axis 68 of the shaft 66. As noted in FIG. 2, a checkered pattern C is shown on one surface of the gunstock.

As shown in FIG. 3 the gunstock W includes three convexly curvilinear surfaces 70, 72 and 74 upon which a checkered design can be cut. Since the stock is hand sanded prior to being checkered, the distance D between the axis 68 and surface 70 will not be equal to the distance $D_1$ between the axis 68 and surface 74. Still further, neither of the distances D or $D_1$ will be equal to the distance $D_2$ between the axis 68 and the surface 72. In order to compensate for the inequality of the locating distances D, $D_1$, and $D_2$, the cutter assembly of this invention includes a vertical self-adjusting feature, which will be explained in greater detail hereinafter.

Figures 5, 5A:
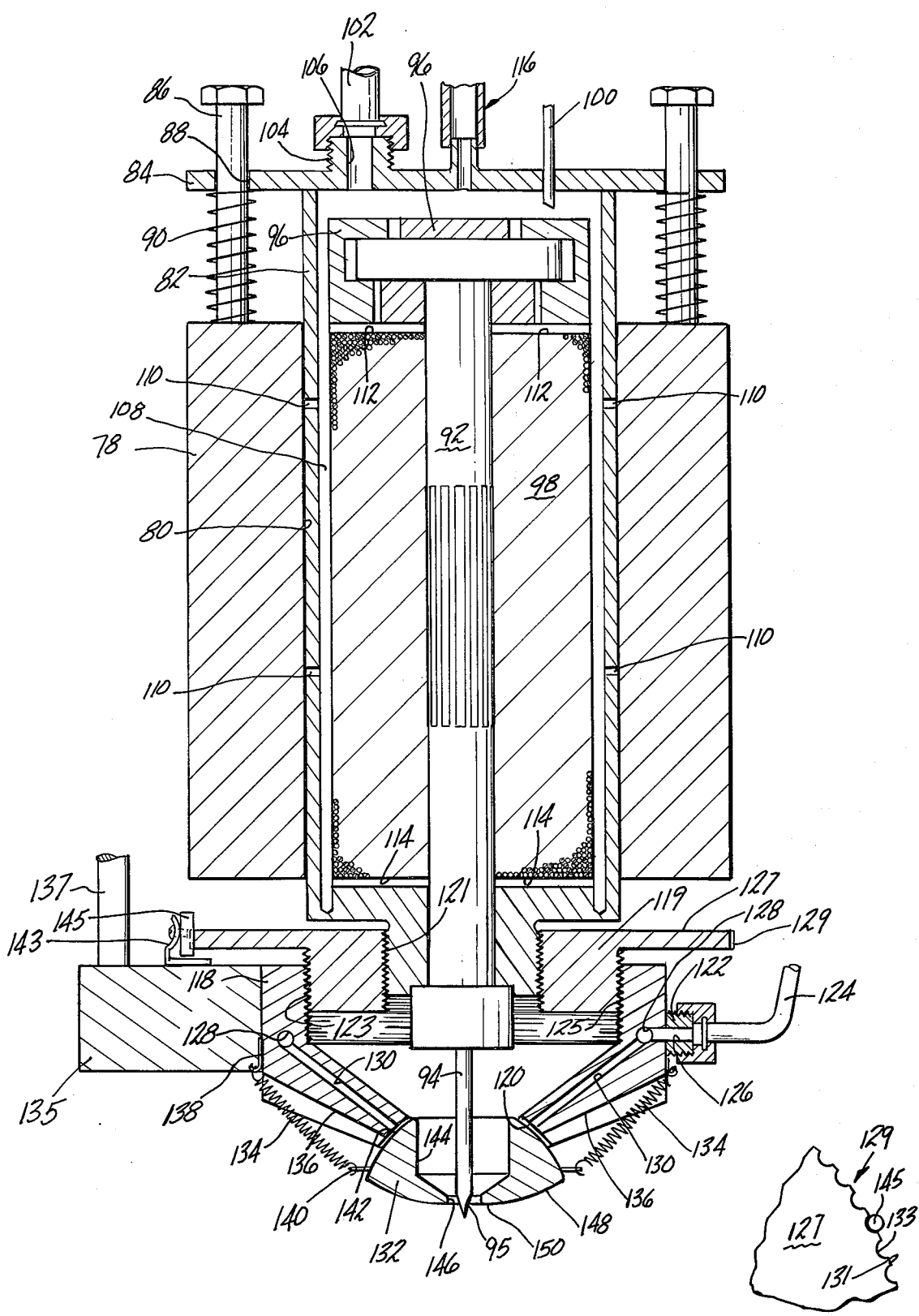
FIG. 5 is a sectional view taken along line 5—5 of FIG. 4.
FIG. 5a is a plan view of a fragmentary portion of the cut depth adjustment sleeve showing the notched edge and detent which combine to indicate exact cut depth changes.

Referring now to FIGS. 4 and 5, a preferred embodiment of the cutter assembly 42 of this invention is shown. The bracket 44 is secured to the bolster 30 by bolts 76. A bearing member 78 is secured to the bracket 44, the bearing member 78 being provided with a through bore 80. A cylindrical motor housing 82 is mounted in the bore 80 and freely slidable therein. A plate 84 is secured to the top of the motor housing 82, the plate 84 being mounted on four pins 86 which pass through apertures 88 in the plate 84. A plurality of coil springs 90 are mounted on the pins 86 and sandwiched between the plate 84 and the bearing member 78 to bias the motor housing 82 upwardly and assist in imparting a vertically floating type of movement to the motor housing 82. Mounted within the motor housing 82 is a rotor 92 to which is secured a cutter 94, whereby the rotor 92 is operative to rotationally drive the cutter 94. A plurality of spacers 96 are mounted in the housing 82 and are operative to properly position the rotor 92. A stationary induction coil 98 is mounted in the housing 82 surrounding the rotor 92 and is operative in a well-known manner to rotatably drive the rotor 92 when supplied with electrical current. Electrical current for the coil 98 is supplied by a power line 100 which is connected to a 1200 Hz. 50V frequency converter. A conduit 102 is attached to a threaded fitting 104 on the plate 84 and is also connected to a source of pressurized air (not shown) so as to deliver pressurized air to the interior of the housing 82 by way of the passage 106. There is provided an annular space 108 between the coil 98 and the housing 82 through which space 108 pressurized air passes to lateral ducts 110 formed in the housing 82 adjacent the bearing bore 80. Thus an air bearing is formed between the bore 80 and the housing 82 to facilitate vertical movement of the latter within the former. Further lateral ducts 112 and 114 are provided between the coil 98 and spacers 96, and the coil 98 and housing bottom wall 83, respectively, for the passage of pressurized air to the rotor 92 to provide an air bearing for the rotor. Furthermore, compressed air circulated through the housing 82 serves to cool the coil 98 during operation of the motor. An exhaust vent 116 is provided in the plate 84 for venting pressurized air to the atmosphere.

A cap 118 is threaded onto a sleeve 119 which in turn is threaded onto the bottom of the motor housing 82. The cap 118 is hollow and includes an opening 120 having a conical surface so as to provide a socket seat. It is noted that the seat could be another configuration such as spherical without departing from the spirit of the invention. A fitting 122 is mounted on the cap 118 and is adapted to receive an air hose 124 which extends from a source of pressurized fluid (not shown). An inlet passage 126 extends from the fitting 122 and opens into a lateral passage 128 which in turn opens into a descending passage 130. There are preferably four such descending passages 130 equally spaced about the axis of the cap 118 and all opening into the socket 120.

A work-contacting member 132 is mounted on the cap 118 by means to a plurality of coil springs 134 disposed in slots 136 in the cap 118. It will be noted that one end of each spring 134 is secured to a hook 138 mounted on the cap 118 and the other end of each spring 134 is secured to a pin 140 secured to the work-contacting member 132. The member 132 is formed with a convex spherical surface 142 so as to form the ball portion of a ball and socket joint between the cap 118 and member 132 which permits the member 132 to pivot universally with respect to the cap 118. The member 132 includes an enlarged internal bore 144 which opens into an aperture 146 through which aperture 146 the point 95 of the cutter 94 protrudes. The aperture 146 is concentric with the cutter 94. The lower surface of the member 132 includes a convexly curved marginal portion 148 and a central planar portion 150.

Referring now to FIG. 6, it will be noted that the planar portion 150 of the member 132 actually contacts the surface 72 of the workpiece W. The spherical ball surface 142 is defined as being the surface of a sphere having a radius R and a center P, with the center P lying on the axis of the cutter 94 and the axis of the aperture 146, and also lying in the plane of the planar surface 150 of the member 132. The point 95 of the cutter 94 projects beyond the point P a distance $d$ which defines the depth of cuts made in the workpiece W. Since the member 132 pivots about the point P, it will be readily appreciated that the distance $d$ will remain constant during pivotal movement of the member 132. Thus the depth of cuts made into the workpiece W will remain constant regardless of the pivotal attitude of the member 132 within prescribed limits.

The width of the planar portion 150 of the member 132 is selected so as to impart to the member 132 sufficient moment to cause the member to pivot about the point P in response to changes in the attitude of the portion 150 caused by the non-planar contour of the surface 72 of the workpiece which the portion 150 contacts. It will further be appreciated that the planar work-engaging portion 150 could be defined merely by the edge 147 of the aperture 146 provided that the aperture 146 were sufficiently large to impart to the member 132 the desired moment, or provided that some additional moment-imparting means were used to contact the surface of the work W and pivot the member 132.

The apparatus operates as follows: The workpiece W, in this case a firearm stock, is clamped in place in the apparatus by means of the clamps 20 and 22. One surface of the work-piece, as for example the surface 72, is upwardly positioned so that a checkering pattern can be imparted thereto. The tape control 40 is then actuated so as to begin rotational movement of the cutter 94 and cause appropriate movement of the lower bolster 10 and the upper bolsters 24 and 30 to occur so that the cutting portion 95 of the cutter 94 is moved down onto the surface 72 of the workpiece. In order to position the cutter 94 for cutting the workpiece, the upper bolster 30 is moved downwardly to a preset position which can be termed the cutting position. The form of the checkering pattern produced is controlled by concurrent movement of the bolsters 10 and 24 in a predetermined manner governed by the tape control 40. Once the bolster 30 is in its cutting position, a relatively minor degree of vertical floating movement of the cutter 94 is produced by the weight of the motor housing 82 and enclosed motor, and the springs 90 in combination with the air bearing between the housing 82 and bearing 78. This floating motion permits the work-engaging surface 150 to remain in contact with the surface of the work as the cutter moves laterally over the work surface despite the convex or concave curvilinear contour of the work surface. At the same time that the motor is turned on to rotate the cutter 94, the pressurized gas sources (not shown) which are connected to the hoses 102 and 124 are actuated so as to direct a stream of pressurized gas through the hoses 102 and 124. The pressurized gas (preferably compressed air) which enters the motor housing 82 through the hose 102 serves to cool the motor and provide the air bearing between the housing 82 and bearing bore 80. The compressed air which enters the fitting 122 and passage 128 by way of the hose 124 passes through the descending passages 130 to the ball and socket joint between the conical surface 120 and the spherical surface 142 so as to provide an air bearing at that ball and socket joint. The latter positive pressure air bearing assists in providing the universal pivoting movement of the member 132 and prevents the accumulation of wood dust from occurring in the ball and socket joint. As the bolster 24 moves laterally in the X direction during the checkering operation, the member 132 will pivot so as to maintain the planar work-engaging portion 150 thereof substantially tangential to the curved surface 72 of the workpiece W, as shown in FIG. 7. Thus the point P will remain substantially on the surface 72 of the workpiece, and the cutting portion 95 of the cutter 94 will project past the surface of the workpiece W (e.g. past the point P) a distance equal to $d$ within predetermined pivotal limits governed by the size of the openings 144 and 146 and the cutter configuration. Thus the depth of the cut in the workpiece will remain equal to the distance $d$. After the checkering pattern C has been cut into the surface 72, the bolster 30 is raised to lift the cutter above the workpiece, and the clamps 20 and 22 are rotated to rotate the workpiece W so as to position one of the surfaces 70 and 74 for checkering. The checkering process is then repeated and the workpiece is again rotated to position the other surface 70 or 74 for checkering. The workpiece may also be rotated about the X axis while cutting to maintain perpendicularity in the Y-Z plane with the cutter.

Referring again to FIGS. 4, 5 and 5a, means for varying the cut depth are shown. As previously noted, the cap 118 is threaded onto a sleeve 119 which in turn is threaded onto the motor housing 82, and the work engaging member 132 is attached to the cap 118 by means of the springs 134. The cutter 94, however, is vertically fixed relative to the motor housing 82. The distance $d$ which the cutter point 95 projects beyond the member 132 can be accurately set by rotating the sleeve 119, which operates as follows. The sleeve 119 is provided with a threaded bore 121 having left hand threads therein which engage complimentary left hand threads formed on the motor housing 82. The outer surface 123 of the sleeve 119 is provided with right hand threads which engage complimentary right hand threads 125 formed in the cap 118. The sleeve 119 also includes a flange 127 having a side surface 129 which is provided with alternating ridges 131 and notches 133. A block 135 is secured to the cap 118 and carries a rod 137. The rod 137 also engages a second block 139 which is secured to the bearing member 78. The rod 137 and blocks 135 and 139 thus prevent rotational movement of the cap 118 but permit vertical movement thereof since the rod 137 is disposed in sliding engagement with an aperture 141 through the block 139. A spring member 143 is mounted on the block 135 and carries a detent 145 which is biased by the spring 143 into engagement with one of the notches 133 on the sleeve flange 127. The right hand and left hand thread combination on the sleeve 119 cause the cap 118 to be moved vertically with respect to the motor housing 82 and cutter 94 when the sleeve 119 is rotated. Thus rotation of the sleeve 119 causes vertical displacement of the planar surface 150 on the work-contacting member 132 with respect to the cutter tip 95, thus varying the depth of cuts made in the workpiece. The spacing between adjacent notches 133 and the size of the left hand and right hand threads can be controlled so that each click resulting from rotating the sleeve 119 results in a predetermined change in cut depth.

It will be readily apparent that a constant depth cut will be provided by providing a point which is maintained conicidental with the curved surface of a workpiece to be cut, and positioning the axis of the cutter so as to pass through the point during the entire cutting operation while maintaining the distance which the cutter projects beyond the point constant during the entire cutting operation. The point is kept on the curved surface of the workpiece by providing a work engaging member having a planar portion which engages the workpiece and which planar portion contains the point at its center. The planar portion is universally pivoted about the point so as to keep the point on the surface of the workpiece. In this manner, checkering patterns are automatically produced which have a constant depth despite the curvilinear contour of the surface of the workpiece being cut, and despite part-to-part variations in the actual contour of the surface of the workpiece. While the device illustrated is a wood checkering or cutting device for use specifically with a gun stock workpiece, it will be readily appreciated that the depth regulator of this invention could be used in connection with other cutting apparatus and for cutting materials other than wood without departing from the spirit of the invention.

While a preferred embodiment of the invention has been disclosed and described, it is not intended to limit the invention otherwise than as required by the appended claims.

What is claimed is:

1. In an apparatus for use with a cutter for controlling the depth of cuts made in a workpiece, said apparatus being of the type comprising first means for contacting the surface of the workpiece, said first means including a planar portion the plane of which contains a point positioned so as to lie on an axis of the cutter whereby the cutter will project beyond said point a predetermined distance; and second means upon which said first means is mounted, said second means being operative to enable said first means to be freely universally pivoted about said point, the improvement comprising bearing means disposed vertically above said first and second means for maintaining said point substantially on the surface of the workpiece, said bearing means comprising a motor housing containing a motor for driving the cutter, and an annular bearing member in which said motor housing is vertically slidably mounted, said first and second means being secured to said motor housing for instantaneous vertically reciprocating movement concurrent with similar movement of said motor housing, an upward component of said vertically reciprocating movement being in response to a vertical force exerted upon said planar portion by vertically rising portions of the surface of the workpiece encountered by said planar portion, and said bearing means further providing instantaneous lowering of said planar portion in response to contact between said planar portion and vertically declining portions of the surface of the workpiece.

2. The apparatus of claim 1, further comprising spring means secured to said first and second means to retain said first means on said second means and to impart pivotal moment to said first means with respect to said second means.

3. The apparatus of claim 2, wherein said spring means is a plurality of coil springs.

4. The apparatus of claim 1, further comprising spring means for biasing said planar portion in an upward direction away from the workpiece to lessen the quantum of vertical force which must be exerted on said planar portion by vertically rising portions of the workpiece encountered by the planar portion to raise the latter.

5. Apparatus for use with a cutter for controlling the depth of cuts made in a workpiece, said apparatus comprising:
   a. a first member for contacting the surface of the workpiece, said first member including a planar portion, the plane of which contains a predetermined point, said first member having a convexly curved surface surrounding said planar portion; an opening in said first member, said opening having its axis passing through said predetermined point; and a convexly spherical surface formed on said member, said convexly spherical surface and said convexly curved surface meeting at a peripheral juncture;
   b. a second member including a concave socket for receiving said convexly spherical surface to provide a ball and socket joint for enabling freely universal pivotal movement to be imparted to said first member; and
   c. coil spring means securing said first member to said second member to impart pivotal moment to said first member without impairing the freely pivotal movement thereof.

6. The apparatus of claim 5, wherein said coil spring means comprises a plurality of coil springs secured to said second member on one end and secured to said first member in close proximity to said peripheral juncture at the other end.

7. An apparatus for making controlled depth cuts on a surface of a workpiece, said apparatus comprising:
   a. a rotary cutter having a vertically disposed axis of rotation;
   b. a motor for rotatably driving said cutter, said motor being contained in a cylindrical housing;
   c. an annular bearing member in which said motor housing is mounted for vertical reciprocating movement;
   d. a manifold member connected to said motor housing for vertical reciprocating movement concurrently therewith, said manifold member including a convex socket; and
   e. a workpiece-contacting member mounted on said manifold member and including a spherically convex surface extending into said socket for freely pivotal movement therein, said workpiece-contacting member including a planar portion disposed on the surface of the workpiece, and an opening through said planar portion, said cutter extending through said opening and having its axis of rotation coaxial with the center of said opening, said workpiece-contacting member being operable to instantaneously impart vertical movement to said motor housing and manifold member in response to contour changes on the surface of the workpiece to maintain contact between said planar portion and the surface of the workpiece being cut.

8. The apparatus of claim 7 futher comprising a plurality of coil springs secured to said manifold member and to said workpiece-contacting member to retain said workpiece-contacting member in place on said manifold member and to impart pivotal moment to said workpiece-contacting member while enabling said freely pivotal movement of said workpiece-contacting member to occur.

* * * * *